United States Patent
Hyman et al.

(10) Patent No.: US 10,601,751 B1
(45) Date of Patent: Mar. 24, 2020

(54) SYSTEMS AND METHODS FOR CONTROLLING USER CONTACTS

(71) Applicant: Braze, Inc., New York, NY (US)

(72) Inventors: Jonathan Hyman, New York, NY (US); Zachary McCormick, New York, NY (US)

(73) Assignee: Braze, Inc., New York, NY (US)

( * ) Notice: Subject to any disclaimer, the term of this patent is extended or adjusted under 35 U.S.C. 154(b) by 0 days.

(21) Appl. No.: 16/399,674

(22) Filed: Apr. 30, 2019

(51) Int. Cl.
*G06F 15/16* (2006.01)
*H04L 12/58* (2006.01)
*G06Q 30/02* (2012.01)
*H04L 29/08* (2006.01)
*H04W 4/14* (2009.01)

(52) U.S. Cl.
CPC ......... *H04L 51/12* (2013.01); *G06Q 30/0254* (2013.01); *G06Q 30/0269* (2013.01); *H04L 51/32* (2013.01); *H04L 67/26* (2013.01); *H04W 4/14* (2013.01)

(58) Field of Classification Search
CPC ......... H04L 51/12; H04L 51/32; H04L 67/26; G06Q 30/0269; G06Q 30/0254; H04W 4/14
See application file for complete search history.

(56) References Cited

U.S. PATENT DOCUMENTS

| | | | | |
|---|---|---|---|---|
| 2007/0055565 A1* | 3/2007 | Baur | ...................... | G06Q 10/02 705/14.53 |
| 2012/0110620 A1* | 5/2012 | Kilar | ...................... | G06Q 30/02 725/34 |
| 2013/0191198 A1* | 7/2013 | Carlson | .............. | G06Q 30/0215 705/14.23 |
| 2016/0014825 A1* | 1/2016 | Kim | ...................... | H04W 76/14 370/329 |
| 2018/0343484 A1* | 11/2018 | Loheide | ............. | H04N 21/2393 |
| 2019/0050910 A1* | 2/2019 | Demsey | ............. | G06Q 30/0269 |

* cited by examiner

*Primary Examiner* — Richard G Keehn
(74) *Attorney, Agent, or Firm* — FisherBroyles, LLP

(57) ABSTRACT

Systems and methods for controlling contacts with a client's users make use of segment-based contact limits. A contact limit sets a maximum number of contacts that a client can have with a user within a predetermined time window. A segment-based contact limit only applies the contact limit to a subset of all the client's users. The type of contact being limited could include messages that are sent to the user or advertising or sales campaigns that are conducted for the user. A segment is a subset of all of the client's users, and a segment may be defined based on one or more filters.

21 Claims, 7 Drawing Sheets

SYSTEMS AND METHODS FOR CONTROLLING USER CONTACTS

BACKGROUND OF THE INVENTION

The invention is related to systems and methods for enhancing customer engagement. In part, this is accomplished by sending messages to customers. The messages could be mobile or browser-based push notifications, text (SMS/MMS) messages, email messages, in-application messages, or an audio recording that is sent to customers via a telephony system.

Another way that customer engagement could be enhanced is via the conduct of an information or advertising campaign. During such a campaign, a series of messages are delivered to a customer over a period of time. Customer actions that occur during the campaign may influence the messages that are sent, or the timing of delivery of the messages.

It is, of course, possible to send too many messages to customers or to conduct too many campaigns over a predetermined period of time, which can result in customer dissatisfaction. The present invention is focused on controlling the delivery of messages or the conduct of campaigns so that customers are not overwhelmed by contacts.

DETAILED DESCRIPTION OF PREFERRED EMBODIMENTS

Figure 1:
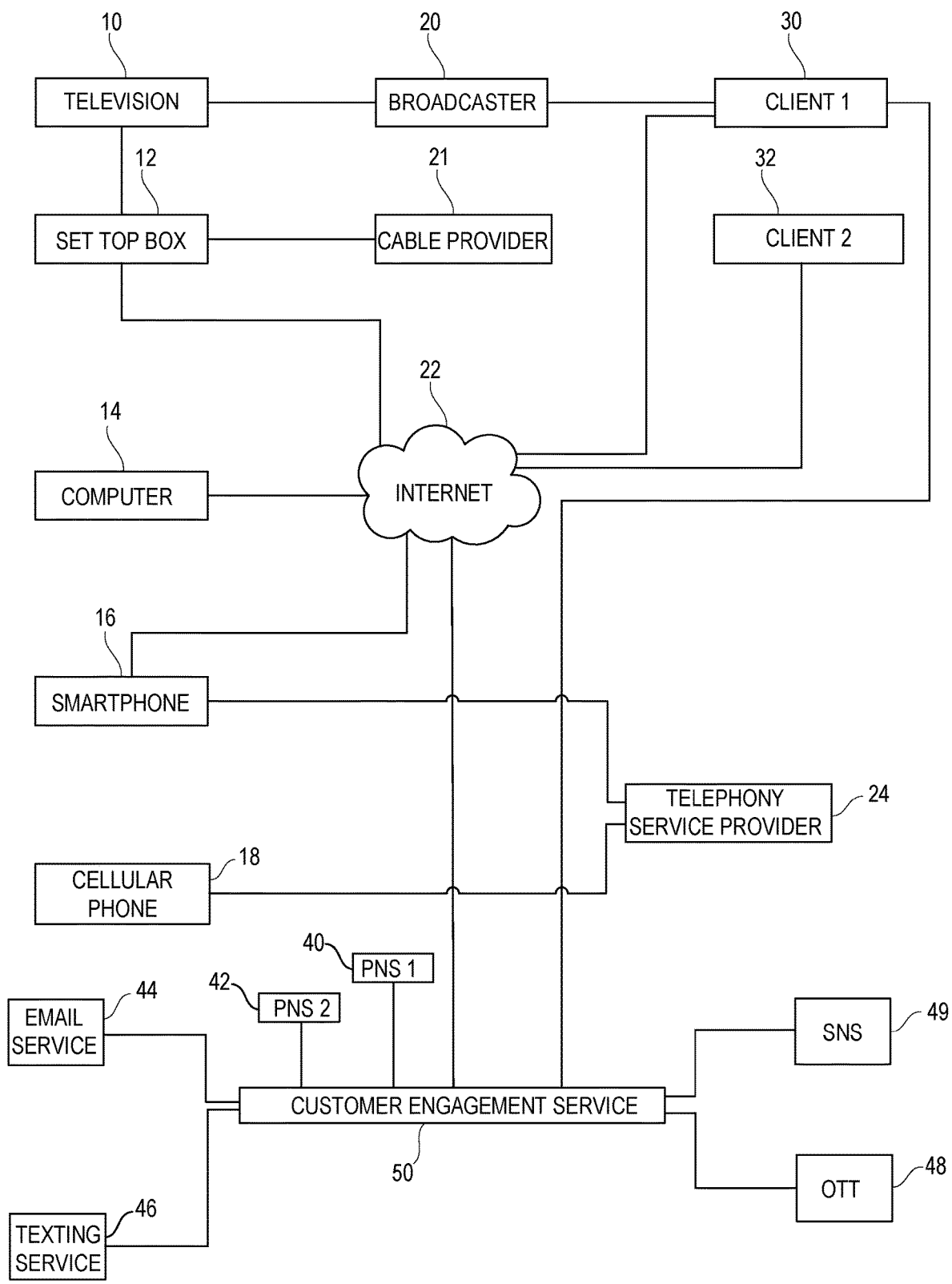
FIG. 1 is a diagram of a communications environment which could be utilized by systems and methods embodying the invention.

The following detailed description of preferred embodiments refers to the accompanying drawings, which illustrate specific embodiments of the invention. Other embodiments having different structures and operations do not depart from the scope of the present invention.

Systems and methods embodying the invention can be part of a customer engagement service. As mentioned above, a customer engagement service helps a company interact with its users to enhance the customer experience and to increase the company's business, revenue and/or stature. One of the ways that a customer engagement service assists a company is by helping the company to manage how and when messages are delivered to the company's customers, and how and when to conduct advertising or information campaigns.

The following description refers to "clients" and to "users". For purposes of this discussion, a "client" would be a client of the customer engagement service. In other words, a company or business that is being assisted by the customer engagement service. "Users" are a client's users, not users of the customer engagement service. The customer engagement service sits between a client and the client's users to manage and orchestrate the delivery of messages sent from the client to its users.

A "message" could take many different forms and be delivered to a user in different ways. For example, a "message" could be a mobile or browser-based push notification sent to users by a push notification service.

A message could also be an in-app message that is delivered to a user via a client's software application. The client's software application could be resident on a user's computer, a user's smartphone or any other device with a processor that is capable of running such a software application. The in-app messages generated and/or delivered by such a software application could be received by the user in various ways.

A message also could be a text message (SMS/MMS) that is delivered to users via a smartphone or via a text messaging software application. A message also could be a message delivered to a user via a social media service, or via an Over The Top (OTT) messaging service. A message also could be an email message that is delivered to users via standard email service providers. Moreover, a message could be an audio message delivered to a user via a telephony or VOIP service provider, or a video message delivered via similar means.

For purposes of the following description and the appended claims, any reference to sending a "message" to users is intended to encompass any of the different types of messages and delivery channels mentioned above, as well as any message types and delivery means that are developed in the future.

A customer engagement service can also help a client to conduct an advertising or informational campaign. During such a campaign, multiple messages are sent to users, typically over a certain period of time. The customer engagement service can help to ensure that the messages are delivered according to a certain sequence, and/or according to a certain timing. For example, the customer engagement service can help to ensure that the second message in the advertising campaign is not sent to a user until the user has reviewed the first message in the campaign.

Similarly, the campaign might be structured such that a third message in the campaign is not sent to a user unless the user first takes a specified action, such as making a purchase from the client who requested the conduct of a campaign.

There are many ways that campaigns can be conducted or structured, the foregoing outlined only two examples. One quality which distinguishes a campaign from simply sending a message is that a campaign typically involves sending a user multiple messages over time. In addition, during a campaign a message trigger usually must be satisfied before a message is sent to a user. The message trigger can be an action taken by the user, the occurrence of an event, or some other trigger condition being satisfied.

FIG. 1 illustrates a communications environment in which systems and methods embodying the invention could be practiced. As shown in FIG. 1, the communications environment includes client one 30, client two 32 and the customer engagement service 50. Client one 30 and client two 32 are clients of the customer engagement service 50. The clients 30/32 can communicate with the customer engagement service directly, via the Internet 22, or via other means.

Users of the clients 30/32 could utilize the clients' 30/32 services in various ways. For example, if client one 30 is a media company that provides media content to its users, client one 30 could produce media content that is sent via a broadcaster 20 to a client's television 10. That media content could be delivered to the user's television 10 via a set top box 12 that is connected to the user's television and to the Internet 22 and/or a cable service provider 21. In some instances, a software application on the set top box 12 that is provided by client one 30 could be used to deliver the content to the user's television 10.

The same or a different user might have a computer 14 that is connected to the Internet 22. The user could utilize a web browser on the computer 14 to access an Internet website provided by client one 30 that also offers media content. Similarly, a software application provided by client one 30 and that is resident on the user's computer 14 might also be used to access media content provided by client one 30 via the Internet 22.

Yet another user may have a smartphone 16 that is capable of communicating over the Internet 22 and/or via a telephony service provider 24. A software application provided by client one 30 and that is resident on the user's smartphone 16 could be used to access media content provided by client one 30 via the Internet 22 or via the telephony service provider 24.

Still another user might have a cellular telephone 18 that is capable of receiving text messages. This would allow the user of the cellular telephone to receive text messages from client one 30.

FIG. 1 also shows that a first push notification service (PNS) 40 and a second push notification service 42 could be used by the customer engagement service 50 to deliver push notifications to smartphones and/or web browsers. Such messages could be delivered by the push notification services 40/42 to user smartphones via the Internet 22 or via a telephony service provider 24 that provides user smartphone with its native telephony service.

FIG. 1 also shows that an email delivery service 44 could be used by the customer engagement service 50 to send email messages to users. Further, the customer engagement service 50 could use a text messaging service 46 to send text messages to users, or an OTT messaging service 48 to send formatted messages to users. Moreover, the customer engagement service 50 might send a message to users via one or more social networking services 49. Of course, the customer engagement service 50 could utilize any other message delivery service as well to communicate messages to users.

The clients 30/32 in this communications environment could be any sort of client that utilizes a customer engagement service 50 to help them manage engagement with their users. As noted above, a client could be a media broadcaster that produces and sends media content to its users. In other instances, a client could be a retailer whose purchasers are its users. In still other instances, the client could be a service provider, such as a telephony service provider or an Internet service provider. Virtually any business that wishes to send messages to its users or conduct advertising or informational campaigns could be a client in this environment.

One of skill in the art will appreciate that FIG. 1 only illustrates a very limited number of devices that would be used by users to receive messages from a client, and that could be used to interact with a client. In reality, there would be a very large number of user devices in such a communications environment. Also, a single user could possess and use multiple devices to access a client's services and to receive messages from a client. Thus, the depiction in FIG. 1 should in no way be considered limiting.

Figure 2:
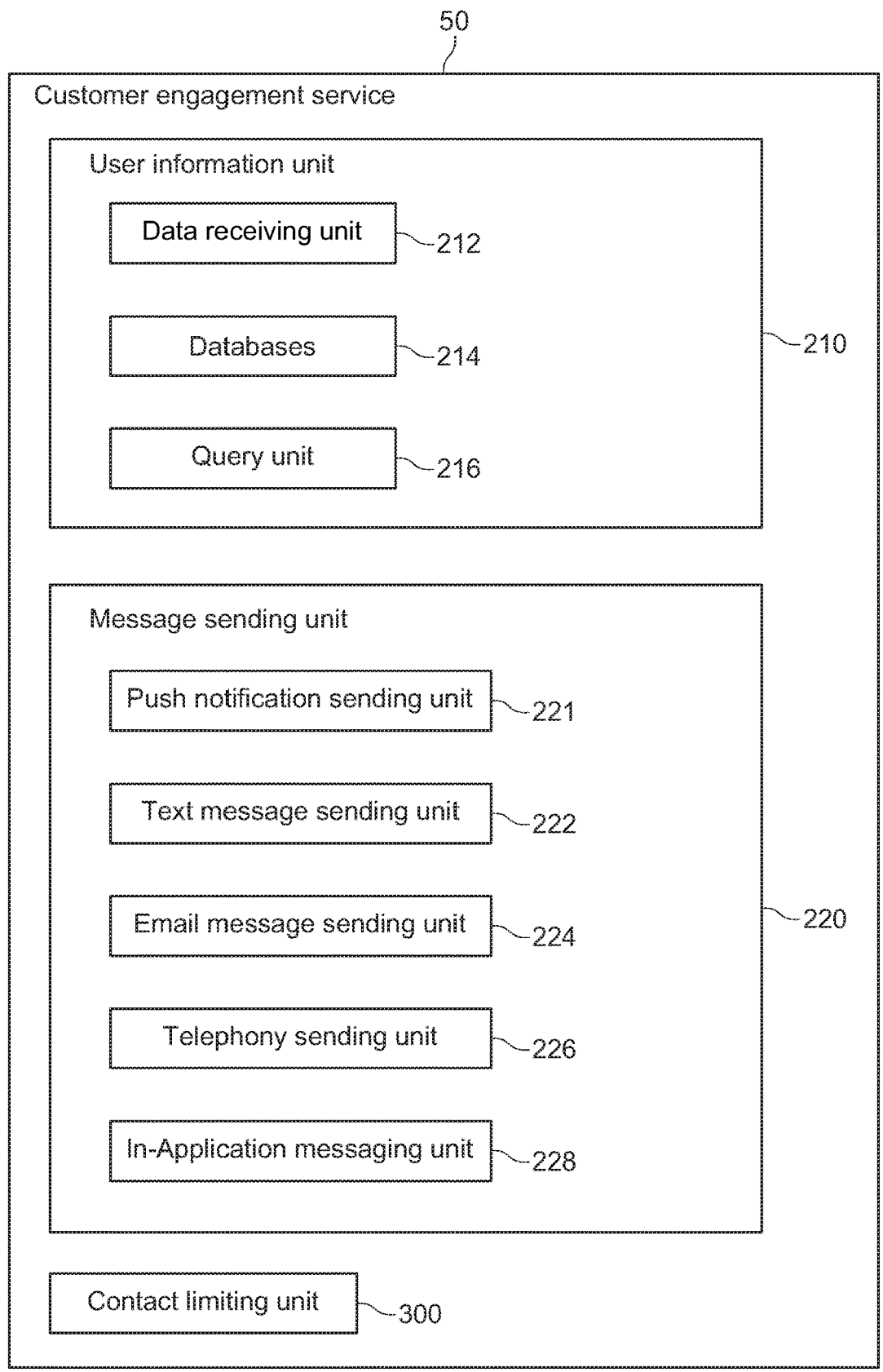
FIG. 2 is a diagram of selected elements of a customer engagement service.

FIG. 2 illustrates selected elements of a customer engagement service 50. The illustration in FIG. 2 is in no way intended to show all elements of a typical customer engagement service 50, and indeed there would typically be many other elements. Likewise, a customer engagement service 50 embodying the invention might not have all the elements illustrated in FIG. 2.

The customer engagement service 50 includes a user information unit 210 that is responsible for receiving and storing information about a client's users, and that is responsible for responding to requests for that stored information. The user information unit 210 includes a data receiving unit 212 that receives various items of information about users, and that stores that received information in databases 214. The information could be received from various sources. However, typically a client would provide information about its users to the data receiving unit 212 via various means.

For example, in some instances a client may send notifications to the data receiving unit 212 each time that one of the client's users engages with the client in some fashion. For example, if the client is an online retailer, each time that a user makes a purchase from the online retailer, the online retailer could send the data about the purchase made by that client to the data receiving unit 212.

In another example, if the client is a media broadcaster, and one of the media broadcaster's users logs onto a website provided by the media broadcaster to access media content, the media broadcaster could send data about that contact to the data receiving unit 212. The data sent could include an identification of the user, the time that the user accessed the website and an indication of what the user accessed or watched while logged into the website. Similarly, any time that a user accesses a client's website, the client could automatically report that user activity to the data receiving unit 212 of the customer engagement service 50.

In yet another example where the client is a media broadcaster, the media broadcaster could have provided a software application to a user that the user has loaded onto a smartphone or a computing device. The software application could be configured to report the actions that a user takes when using the software application directly to the data receiving unit 212 of a customer engagement service 50. Indeed, in any instance where the client has provided a software application to its users, the software application could be configured to report user activity to the data receiving unit 212 of the customer engagement service 50.

Because clients and software applications that the clients provide to their users all report user activity to the customer engagement service 50, the customer engagement service 50 is able to build a detailed picture of each user, the user's preferences, and the user's typical courses of action.

In addition, because the customer engagement service 50 is tasked by its client with the delivery of messages to the client's users, the customer engagement service 50 is also able to build up a record of how and when individual users react to a sent message. This could include an indication of when a user opens a sent message after delivery, and whether and when the user takes an action in response to receipt of a message. For example, because the data receiving unit 212 is also receiving information from the client regarding user contacts with the client, the customer engagement service 50 may learn that shortly after an individual user received a message from the client, the user logged into the client's website. Or that shortly after the user received a message, the user opened a software application provided by the client. For all these reasons, the customer engagement service 50 is able to build detailed user profiles that can be used to predict how individual users will act in certain situations, or how they will respond to certain forms of messaging.

As shown in FIG. 2, the user information unit 210 also includes a query unit 216. The query unit 216 queries the databases 214 to obtain various items of information about the users.

The customer engagement service 50 also includes a message sending unit 220. The message sending unit 220 is responsible for sending messages to a client's users. As explained above, messages could take many different forms and have many different delivery channels. The message sending unit 220 includes a push notification sending unit 221 that causes mobile or browser-based push notifications to be sent to users via one or more push notification services 40/42, as illustrated in FIG. 1. The push notification sending unit 221 may obtain telephone numbers and push notification service credentials for individual users from the databases 214 with the assistance of the query unit 216. Alternatively, the client may provide that information to the message sending unit 220. The user credential information is then used to cause one or more push notification services 40/42 to deliver a message to the users.

The message sending unit 210 may also include a text message sending unit 222 that causes text-based messages to be sent to users. The text-based messages could be traditional SMS/MMS messages, or messages that are delivered to users via an OTT messaging service or perhaps a social networking service. Information needed to send such text-based messages to users may also be obtained from the databases 214 of the user information unit 210, or that information may be provided by the client. Here again, the message sending unit can enlist the services of one or more text-based message delivery platforms to actually send the message to users.

The message sending unit 220 may also include an email message sending unit 224 that causes email messages to be sent to users. The email message sending unit 224 may obtain email addresses and other information, such as user names, for individual users from the databases 214 with the assistance of the query unit 216, or that information may be provided by the client. The information is then used to send email messages to users. The email messages may be delivered to users by one or more third party email services.

The message sending unit 220 may also include a telephony sending unit 226 that is responsible for delivering audio messages to users via a telephony system. For example, the telephony sending unit 226 could generate an audio recording of a message that is to be delivered to users, or the telephony sending unit 226 could receive such an audio message directly from the client. The telephony sending unit 226 would then obtain information about individual customers from the databases 214 with the assistance of the query unit 216, such as user telephone numbers and user names, or that information could be provided by the client. The telephony sending unit 226 would then enlist the aid of an outside service to deliver the audio message to users via a traditional or VOIP telephony system.

In some instances, the telephony sending unit 226 could generate and operate interactive voice response (IVR) applications to deliver such audio messages to users. Doing so may allow a user to request and receive information or services in addition to the original audio message. If a user does interact with an IVR application, how the user interacts with the IVR application could also be recorded in the databases 214 as additional information about the user.

The message sending unit 220 further includes an in-application messaging unit 228. The in-application messaging unit 228 is responsible for causing messages to be delivered to a user via a client's software application that it provides to its users. For this reason, the in-application messaging unit 228 can interact with an instantiation of a client's software application that is resident on a user's computing device, as will be explained in detail below.

The customer engagement service 50 could coordinate the actions of all of the above-discussed elements to conduct an advertising or information campaign. As noted above, such a campaign typically involves sending multiple messages to users over a period of time. The messages could all be sent via the same message delivery channel, or the campaign could involve sending messages to users via multiple message delivery channels.

The customer engagement service also includes a contact limiting unit 300, which acts to limit contacts between a client and the client's users under defined circumstances. The client or the customer engagement service 50 could impose limits on user contacts to help prevent user dissatisfaction due to contacts becoming too frequent. The contact limiting unit 300 is responsible for imposing or enforcing those contact limits.

In general terms, contact limits are expressed as a maximum number of a certain type of contact that can occur for a given user during a certain time window. For example, a contact limit could be that no given user is to receive more than 5 messages during any forty-eight hour period. A contact limit could also be expressed as a limit on a particular form of messaging, such as no given user is to receive more than 1 push notification each 60 minutes. Contact limits could also be based on campaigns such as no given user is to be given more than four campaigns in any four-week period.

Figure 3:
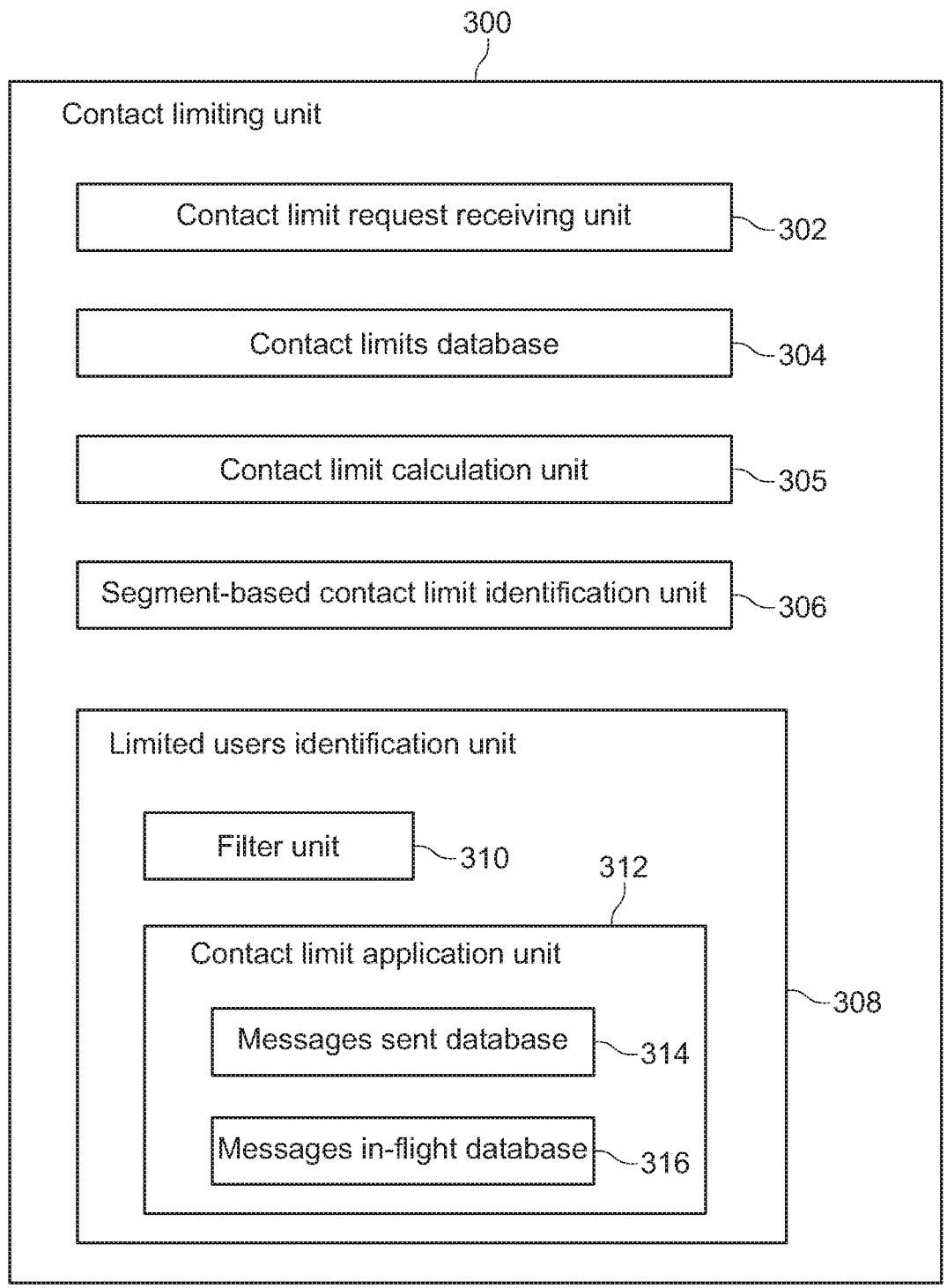
FIG. 3 is a diagram illustrating selected elements of a contact limiting unit embodying the invention that may be a part of a customer engagement service.

FIG. 3 illustrates selected elements of a contact limiting unit 300 which could be part of a customer engagement service 50. The contact limiting unit 300 includes a contact limit request receiving unit 302 that receives contact limit requests. Often the contact limit request would be received or input by the client that hired the customer engagement service 50 to help manage its contacts with its users. In other instances, a contact limit request could be received from or input by other personnel, such as personnel at the customer engagement service 50 itself.

As explained above, a contact limit could be expressed as the maximum number of contacts that a given user could receive during a time window, or perhaps the maximum number of campaigns that any given user should receive during a time window. However, such a contact limit request could also be further defined by limits on the users to whom the contact limit should apply. For purposes of the following description, we call this type of a contact limit a segment-based contact limit because a segment-based contact limit only applies to a segment (subset) of the client's users.

The way that a segment is defined could vary depending on the circumstances. Often a segment is specified using one or more filters that apply to only certain of a client's users. For example, a segment-based contact limit could indicate that males between the ages of 18 and 40 are not to be given more than one campaign in any seven-day period. The filters used to define the segment of that segment-based contact limit are gender (males only) and age (only people between the ages of 18 and 40). This type of a segment-based contact limit is based on characteristics of the users.

Segments may also be based on things such as the user's location (city/state/country), the language that a user speaks, or other similar user characteristics.

However, as explained above, a customer engagement service 50 will typically have detained knowledge of how individual users have interacted with a client over time due to reports on user behavior received from the clients themselves. As a result, a segment-based contact limit could also be based on aspects of customer behavior. For example, a segment-based contact limit could specify that users who have not spent more than $20 with the client within the last fourteen days should not be given more than two campaigns in any given seven-day period. Or a segment could be based on the last date that users opened a software application. Thus, segments can be based on filters that have to do with customer behavior in addition to customer characteristics.

Moreover, a segment might be based on aspects of the users' computing devices or communications equipment. For example, a segment may be based on the type of operating system the users' computing devices run.

A contact limit, whether it be a global one that applies to all of a client's users or a segment-based contact limit that only applies to a segment of a client users, may be stored in a contact limits database 304. In some embodiments, the customer engagement service 50 maintains separate contact limits databases 304 for each client. In other embodiments, the contact limits database 304 may include information about contact limits for multiple clients, or even for all the client's served by the customer engagement service 50.

The contact limiting unit 300 may also include a contact limit calculation unit 305 that is used to establish contact limits. The contact limit calculation unit 305 uses information about past messaging and/or campaign activity and information about how users reacted to that messaging and/or campaign activity to determine appropriate contact limits.

For example, the contact limit calculation unit 305 could review how past messaging and/or campaign activity affected males between the ages 20 and 35 in making purchases from an online retailer. If the contact limit calculation unit 305 determines that when males between the ages of 20 and 35 received fewer than ten messages per week from the online retailer, they made more purchases than if they received ten or more messages per week, the contact limit calculation unit 305 could establish a contact limit of fewer than 10 messages per week for males between the ages of 20 and 35.

The contact limit calculation unit 305 might also take into account various other data and factors when establishing contact limits. For example, during periods of time where users are being sent more advertising or marketing messages than normal, such as during Thanksgiving or the Christmas holidays, the contact limit calculation unit 305 may establish lower than normal thresholds for the number of permitted contacts with users.

A contact limit established by the contact limit calculation unit 305 could be stored in the contact limits database 304. However, in alternate embodiments, and as discussed in more detail below, the contact limit calculation unit 305 could perform a calculation at the time a message is about to be sent to a user to see if it makes sense to send the message to the user. In other words, when the customer engagement service 50 is about to send a message to a user, rather than checking to see if one or more predetermined contact limits exist for the user, the contact limit calculation unit 305 may perform a calculation using then-available data to create a new contact limit that applies to the user. A determination is then made to decide if the newly calculated contact limit should prevent the message from being sent to the user.

Similarly, when the customer engagement service 50 is about to send a message to a plurality of users, the contact limit calculation unit 305 could perform calculations using then-available data to set one or more contact limits for those plurality of users. The calculated contact limits are then used to determine if the message should be sent to all of those plurality of users. In this scenario, the contact limit calculation unit 305 might establish multiple segment-based contact limits, and for each individual user, a check must be performed to ensure that none of the established segment-based contact limits prevents the message from being sent to the user.

The contact limiting unit 300 also includes a segment-based contact limit identification unit 306. The segment-based contact limit identification unit 306 acts when a client requests that a new message be sent to all of its users, or to a segment of the client's users. The segment-based contact limit identification unit 306 might also act when a client requests that a new campaign be conducted for all of its users, or for a segment of the client's users. Under those circumstances, the segment-based contact limit identification unit 306 determines if there are any contact limits in place, as reflected within the contacts limits database 304, that would be triggered by the newly requested message or campaign.

As mentioned above, the general idea is to prevent a user from receiving a message or a campaign if one of the contact limits that is in place for the user, or that are newly calculated for the user, would be violated by the message or campaign. A limited user identification unit 308 is configured to identify those users that fall within a contact limit and for whom the contact limit would be violated by a requested message or campaign. This could include determining those users that fall within a predetermined contact limit stored in the contact limits database 304 or determining those users that fall within a newly established contact limit set by the contact limit calculation unit 305.

A filter unit 310 of the limited users identification unit 308 operates to identify those users who are eligible to receive the message or campaign and for whom a contact limit exists. The contact limit application unit 312 then determines if any of the contact limits would be violated by the requested message or campaign. If so, the contact limit application unit 312 prevents the user from receiving the message or campaign.

The contact limit application unit 312 may also operate to resolve potential conflicts in the application of contact limits. For example, assume there is a contact limit that applies to a user that indicates that the user should only receive two messages in any given day. Further assume that there are three campaigns that are active for the user, and all three of the campaigns are configured to send the user a message at 9 am. If all three campaigns sent their message to the user, the contact limit would be violated. The contact limit application unit 312 uses at least two databases to resolve that potential conflict and to ensure that the user only receives two messages in a given day.

The contact limit application 312 unit includes a messages sent database 314 that tracks the number of messages that have been sent to each user for one or more periods of time. For example, the messages sent database 314 can have a separate record for each user, and each user record will indicate how many messages have been sent to a user for at least one period of time. Thus, a user record could indicate how many messages have been sent to the user over the last 24 hours. Each user record could also have fields to indicate the number of messages that have been sent to the user for other periods of time, such as the number of messages sent to the user over the last 2 hours, or the number of messages sent to the user over the last week.

The contact limit application unit 312 also includes a messages in-flight database 316, which tracks the number of messages that one or more campaigns are preparing or attempting to send to users. The messages in-flight database 306 also has a separate record for each user. Each record is essentially a list of the messages that campaigns are preparing or attempting to send to the user.

We will now use an example to help explain how the databases of the contact limit application unit 312 can be used to help prevent conflicts between campaigns, and to prevent a contact limit from being violated. Assume that a first campaign wishes to send a message to a user. The first campaign begins by determining whether there are any contact limits that apply to that user. For purposes of this example, let's assume that the first campaign learns that a contact limit applies to the user, and prevents more than two messages from being sent to the user in any given day.

The first campaign then consults the messages sent database 314 to determine how many messages, if any, have already been sent to the user today. Assume that the first campaign learns that only a single message has been sent to the user today. This would be good news, but the first campaign then needs to consult the messages in-flight database 316 as well. Assume that in consulting the messages in-flight database 316, the first campaign finds an entry in the database indicating that a second campaign is presently attempting to send a message to the user. If the second campaign is successful in sending its message to the user, the user will have received two messages today, which is the contact limit for the user. However, if the second campaign is unsuccessful in sending its message to the user, it will still be possible to send another message to the user without violating the two-messages-a-day limit that applies to the user.

Under these circumstances, the first campaign makes another entry in the user's record of the messages in-flight database 316 indicating that the first campaign would like to send a message to the user. This essentially reserves a spot for the first campaign to send a message to the user in the event the second campaign is unsuccessful in delivering its message to the user. Other campaigns might also make an entry in the messages in-flight database to reserve a spot for sending a message to the user, and each reserved spot would be tracked in the order in which they are recorded. Also, a campaign may simultaneously add an entry in the in-flight database 316 and retrieve data from the in-flight database 316, which helps to prevent a race condition.

The first campaign could then periodically check back and look into both the messages sent database 314 and the messages in-flight database 316 to see if a spot for sending a message to the user opens up. If the second campaign is unsuccessful in sending its message to the user, ultimately the second campaign will remove its entry from the messages in-flight database 316. When that happens, the first campaign can proceed with its attempt to send a message to the user. If the first campaign is successful in sending its message to the user, its entry in the messages in-flight database is removed and the messages sent database 314 is updated to indicate that two messages have been sent to the user.

If a campaign has made an entry in the in-flight database 316 indicating that it would like to send a message to a user, and the campaign later determines that it cannot or will not send a message to that user, the campaign will go back and remove its entry from the in-flight database 316 so that other campaigns are not prevented from sending a message to the user.

By using both the messages sent database 314 and the messages in-flight database 316, the customer engagement service can provide for orderly message delivery to user that does not violate any contact limits.

There are two related concepts here which bear a brief discussion. The first concept is that a client might request that its users receive a message or campaign, and that contact request could be limited to a segment (subset) of the client's users. Under those circumstances, only a segment (subset) of the client's users would even be eligible to receive the message or campaign.

At the same time, the client's users may be subject to one or more segment-based contact limits. A segment-based contact limit, however, is often not defined in the same way as the limitation on which users are eligible to receive a message or campaign.

Deciding whether individual users should receive a message involves the application of multiple filters. First, we filter to identify the users eligible to receive a message. We then filter to determine which of those users are under one or more contact limits. In point of fact, it might only require only a single operation which involves applying multiple filters to identify the users who are both eligible to receive a message, and under some sort of segment-based contact limit.

For the users who are eligible to receive the message and who are under a segment-based contact limit, we then must determine whether sending the message or conducting the campaign would violate one of the segment-based contact limits. This operation might also be part of a single operation that involves applying multiple filters if available user information allows for the application of filters to determine if a segment-based contact limit would be violated by the requested contact. Alternatively, multiple operations could be performed where those users that might be potentially affected by a segment-based contact limit are identified in a first operation, and where a second operation is performed to determine if proceeding with the requested contact would violate a segment-based contact limit.

The segment-based contact limit identification unit 306 is intended to identify any contact limits that are in place for those users who are eligible to receive a requested message or campaign. The limited users identification unit 308 then determines whether individual users should be prevented from receiving the requested message or campaign because a contact limit would be violated if they receive the requested message or campaign.

We will now turn to a description of several methods embodying the invention that would be conducted by a contact limiting unit 300 embodying the invention. The first method 400 illustrated in FIG. 4 starts and proceeds to step 402, where a customer engagement service 50 receives a request to make contact with a plurality of a client's users. The contact could be delivering a message to users, conducting a campaign or some other form of contact.

The method then proceeds to step 404, where a segment-based contact limit identification unit 306 obtains information about a segment-based contact limit that is in place for the users who are eligible to receive the contact. The information about the segment-based contact limit could include filter criteria that define the segment, as well as a maximum number of contacts that a given user within the segment can receive within a predetermined time window. The method then proceeds to step 406, where a limited user identification unit 308 identifies users that fall within the segment of the segment-based contact limit and for whom the segment-based contact limit would be violated by the requested contact.

In step 408, the contact limit application unit 312 acts to prevent the requested contact from occurring for those users that fall within the segment of the segment-based contact limit and for whom the segment-based contact limit would be violated by the requested contact. The method then ends.

A method as described above could be conducted for each segment-based contact limit that exists for any users who are eligible to receive a requested contact. Alternatively, step 404 could involve obtaining information for any and all segment-based contact limits that apply to users eligible to receive a requested contact, and steps 406 and 408 could be performed for all those segment-based contact limits.

In alternate embodiments, in step 404 rather than obtaining information about an existing segment-based contact limit, step 404 could involve calculating one or more contact limits for the plurality of users who are eligible receive the contact using then-available data. This would be done by the contact limit calculation unit 305 of the contact limiting unit 300. If the contact limit calculation unit 305 decides that one or more contact limits should be established for the users who are eligible to receive the contact, then steps 406 and 408 would apply those contact limits to prevent the contact from occurring for those users that fall within a segment of a segment-based contact limit and for whom the segment-based contact limit would be violated by the requested contact.

Figure 5:
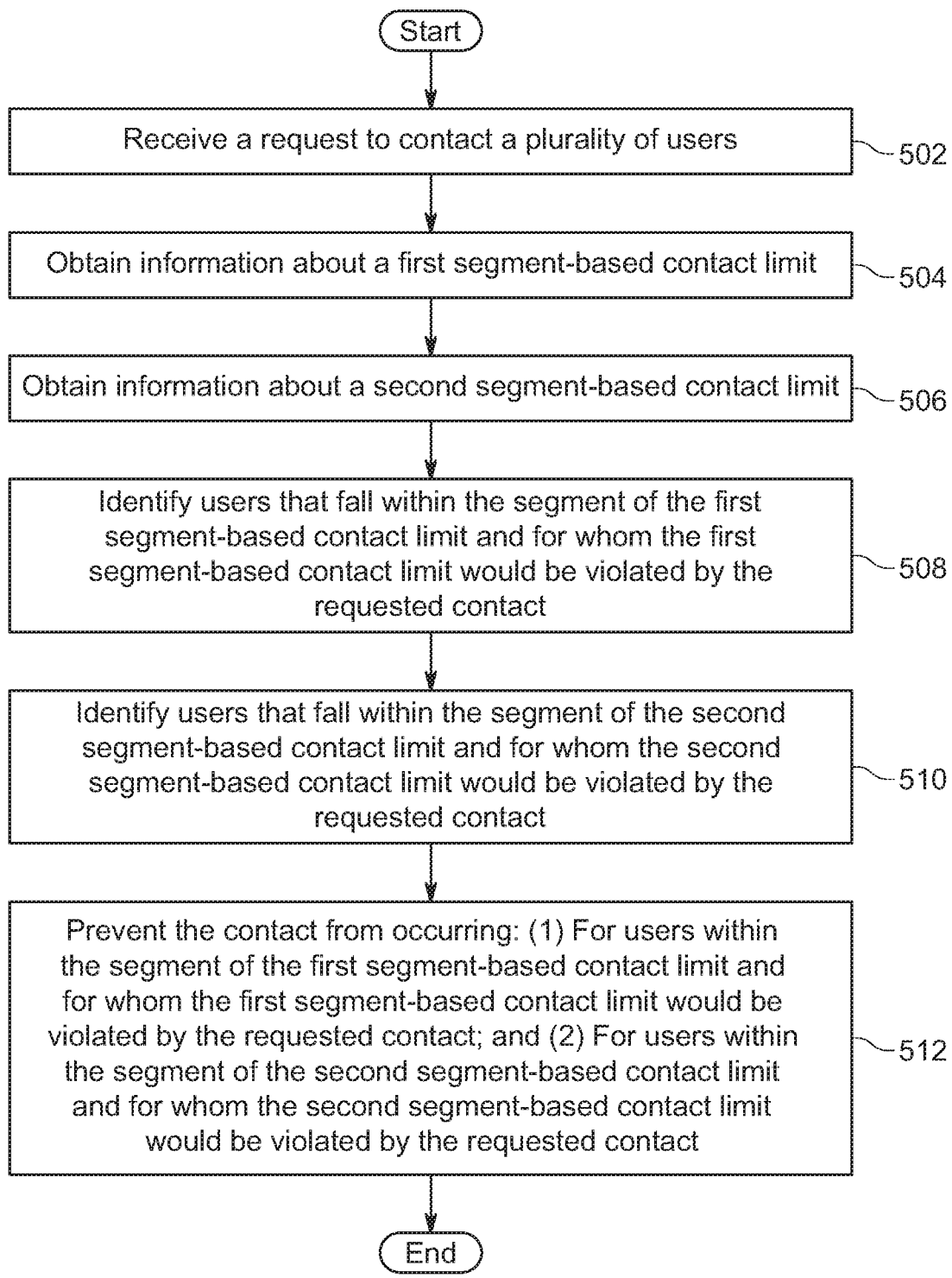
FIG. 5 is a flowchart illustrating steps of another method embodying the invention for limiting contacts with users.

FIG. 5 illustrates another way of performing a method for limiting contacts to users based on segment-based contacts. The method 500 begins and proceeds to step 502 where the customer engagement service receives a request to contact a plurality of a client's users. In step 504, segment-based contact limit identification unit 306 identifies a first segment-based contact limit that applies to users eligible to receive the contact and obtains information about that first segment-based contact limit. In step 506, segment-based contact limit identification unit 306 identifies a second segment-based contact limit that applies to users eligible to receive the contact and obtains information about that second segment-based contact limit. Additional steps for identifying additional segment-based contact limits and obtaining information about those additional segment-based contact limits could also optionally be performed.

In step 508, a limited user identification unit 308 identifies users that fall within the segment of the first segment-based contact limit and for whom the first segment-based contact limit would be violated by the requested contact. In step 510, the limited user identification unit 308 identifies users that fall within the segment of the second segment-based contact limit and for whom the second segment-based contact limit would be violated by the requested contact.

In step 512, the contact limit application unit 312 acts to prevent the requested contact from occurring for those users that fall within the segment of the first segment-based contact limit and for whom the first segment-based contact limit would be violated by the requested contact, as well as for users that fall within the segment of the second segment-based contact limit and for whom the second segment-based contact limit would be violated by the requested contact. The method then ends.

Figure 6:
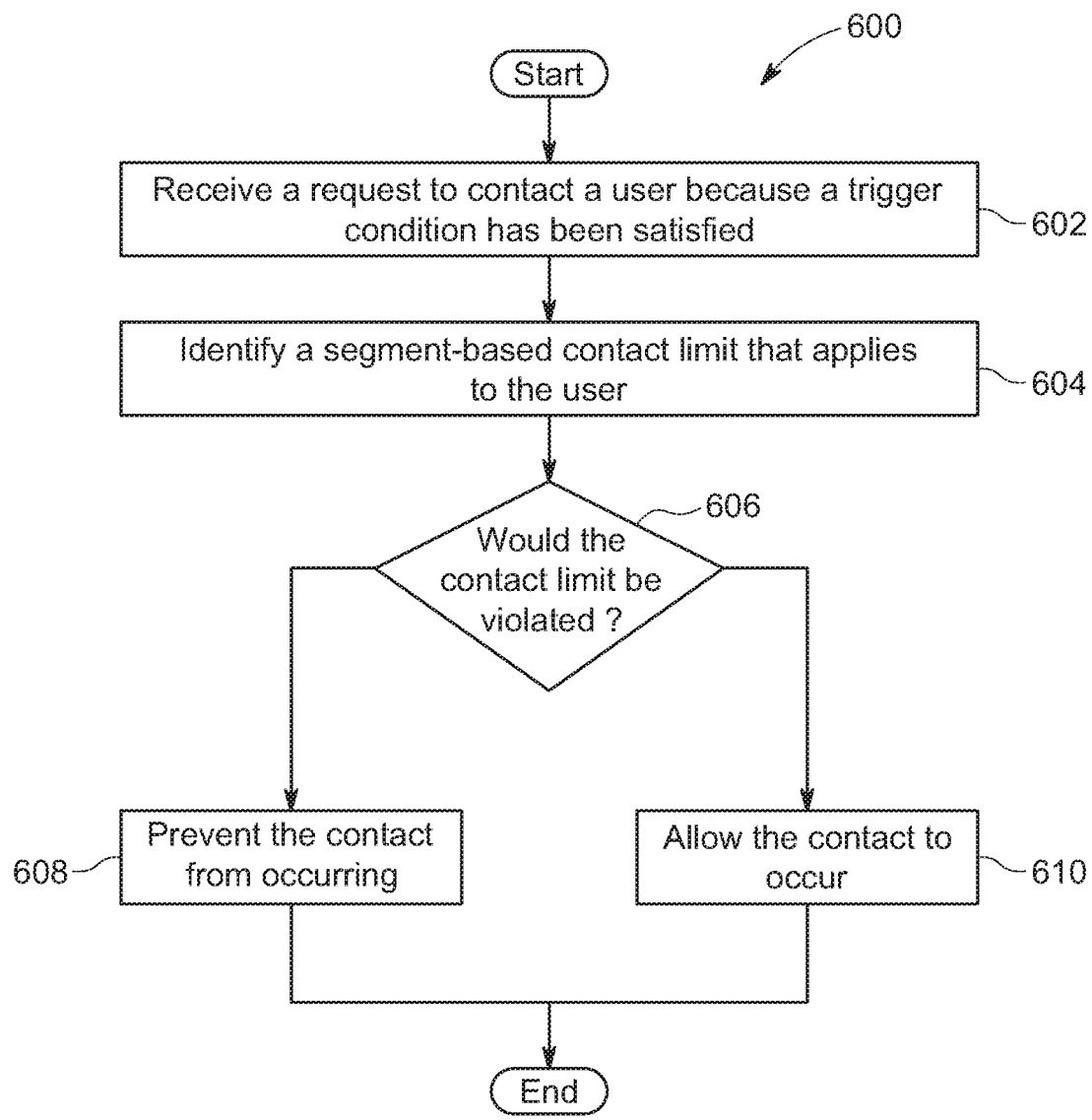
FIG. 6 is a flowchart illustrating steps of another method embodying the invention for limiting contacts with a user.

FIG. 6 illustrates steps of another method of limiting contacts with users. This method is performed for an individual user when an element of the customer engagement service receives a request to make contact with an individual user. This could occur under many circumstances, but would often occur as part of a campaign. During a campaign, when a message trigger condition is satisfied, an element of the customer engagement service requests that a message be sent to the user. For example, if the message trigger is the user taking a particular action, when the user takes that action, an element of the customer engagement service 50 would request that a message be sent to the user.

The method 600 begins and proceeds to step 602, where a customer engagement service 50 receives a request to make contact with an individual user because a trigger condition has been satisfied. The method then proceeds to step 604, where a segment-based contact limit identification unit 306 obtains information about a segment-based contact limit that applies to the user. The information about the segment-based contact limit could include filter criteria that define the segment, as well as a maximum number of contacts that a given user within the segment can receive within a predetermined time window.

The method then proceeds to step 606, where a determination is made about whether the requested contact would violate the segment-based contact limit. If so, the method proceeds to step 608, where the contact is prevented from occurring. The method would then end. If the requested contact would not violate the segment-based contact limit, the method instead proceeds to step 610, and the contact is allowed to occur. The method then ends.

Although the method described above could be performed when the criteria of a campaign indicate that a message or other form of contact with a user should occur, the method could also be performed in different circumstances that are unrelated to campaigns.

Also, in the method described above, step 604 involved identifying a segment-based contact limit that applies to the user. This would typically involve consulting the contact limits database 304 to identify any predetermined contact limits that might apply to the user. In alternate embodiments, step 604 could involve the contact limit calculation unit 305 calculating a contact limit for the user using then-available data. If the contact limit calculation unit 305 indicates that a contact limit should be applied for the user, step 606 of the method would involve determining if the requested contact would violate the newly established contact limit.

Methods as described above allow contact limits to be imposed on subsets of a client's users. That capability, in combination with the ability to identify a different subset of all the client's users who are even eligible to receive a contact allow for great flexibility in such contact limits are defined and enforced.

The present invention may be embodied in methods, apparatus, electronic devices, and/or computer program products. Accordingly, the invention may be embodied in hardware and/or in software (including firmware, resident software, micro-code, and the like), which may be generally referred to herein as a "circuit" or "module." Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer-usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 7:
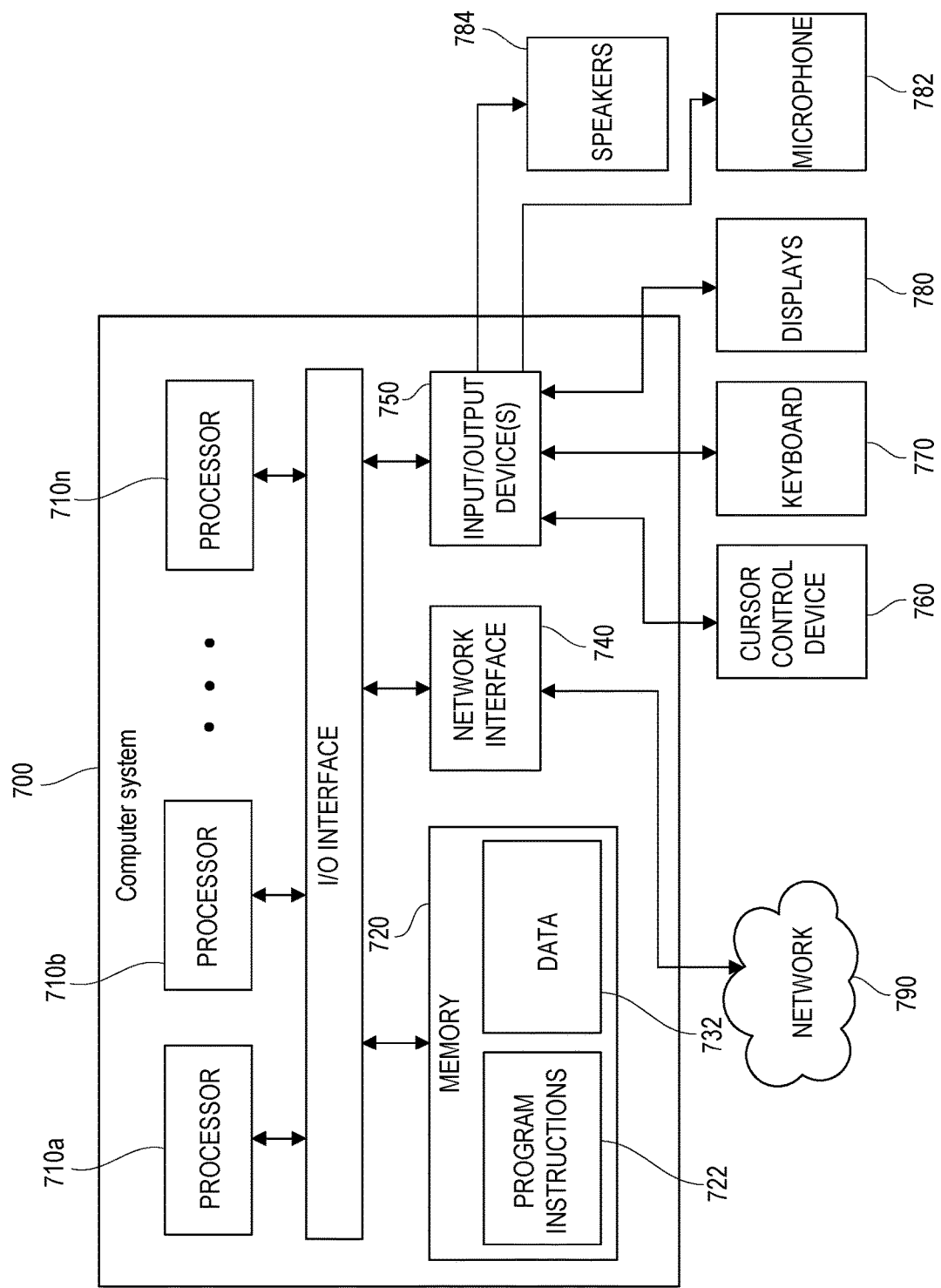
FIG. 7 is a diagram of a computer system and associated peripherals which could embody the invention, or which could be used to practice methods embodying the invention.

FIG. 7 depicts a computer system 700 that can be utilized in various embodiments of the present invention to implement the invention according to one or more embodiments. The various embodiments as described herein may be executed on one or more computer systems, which may interact with various other devices. One such computer system is the computer system 700 illustrated in FIG. 7. The computer system 700 may be configured to implement the methods described above. The computer system 700 may be used to implement any other system, device, element, functionality or method of the above-described embodiments. In the illustrated embodiments, the computer system 700 may be configured to implement the disclosed methods as processor-executable executable program instructions 722 (e.g., program instructions executable by processor(s) 710) in various embodiments.

In the illustrated embodiment, computer system 700 includes one or more processors 710a-710n coupled to a system memory 720 via an input/output (I/O) interface 730. Computer system 700 further includes a network interface 740 coupled to I/O interface 730, and one or more input/output devices 750, such as cursor control device 760, keyboard 770, display(s) 780, microphone 782 and speakers 784. In various embodiments, any of the components may be utilized by the system to receive user input described above. In various embodiments, a user interface may be generated and displayed on display 780. In some cases, it is contemplated that embodiments may be implemented using a single instance of computer system 700, while in other embodiments multiple such systems, or multiple nodes making up computer system 700, may be configured to host different portions or instances of various embodiments. For example, in one embodiment some elements may be implemented via one or more nodes of computer system 700 that are distinct from those nodes implementing other elements. In another example, multiple nodes may implement computer system 700 in a distributed manner.

In different embodiments, the computer system 700 may be any of various types of devices, including, but not limited to, a personal computer system, desktop computer, laptop, notebook, or netbook computer, a portable computing device, a mainframe computer system, handheld computer, workstation, network computer, a smartphone, a camera, a set top box, a mobile device, a consumer device, video game console, handheld video game device, application server, storage device, a peripheral device such as a switch, modem, router, or in general any type of computing or electronic device.

In various embodiments, the computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs). In multiprocessor systems, each of processors 710 may commonly, but not necessarily, implement the same ISA.

System memory 720 may be configured to store program instructions 722 and/or data 732 accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 720. In other embodiments, program instructions and/or data may be received, sent or stored upon different types of computer-accessible media or on similar media separate from system memory 720 or computer system 700.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network (e.g., network 790), such as one or more external systems or between nodes of computer system 700. In various embodiments, network 790 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 740 may support communication via wired or wireless general data networks, such as any suitable type of Ethernet network; for example, via telecommunications/telephony networks such as analog voice networks or digital fiber communications networks, via storage area networks such as Fiber Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or accessing data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

Figure 4:
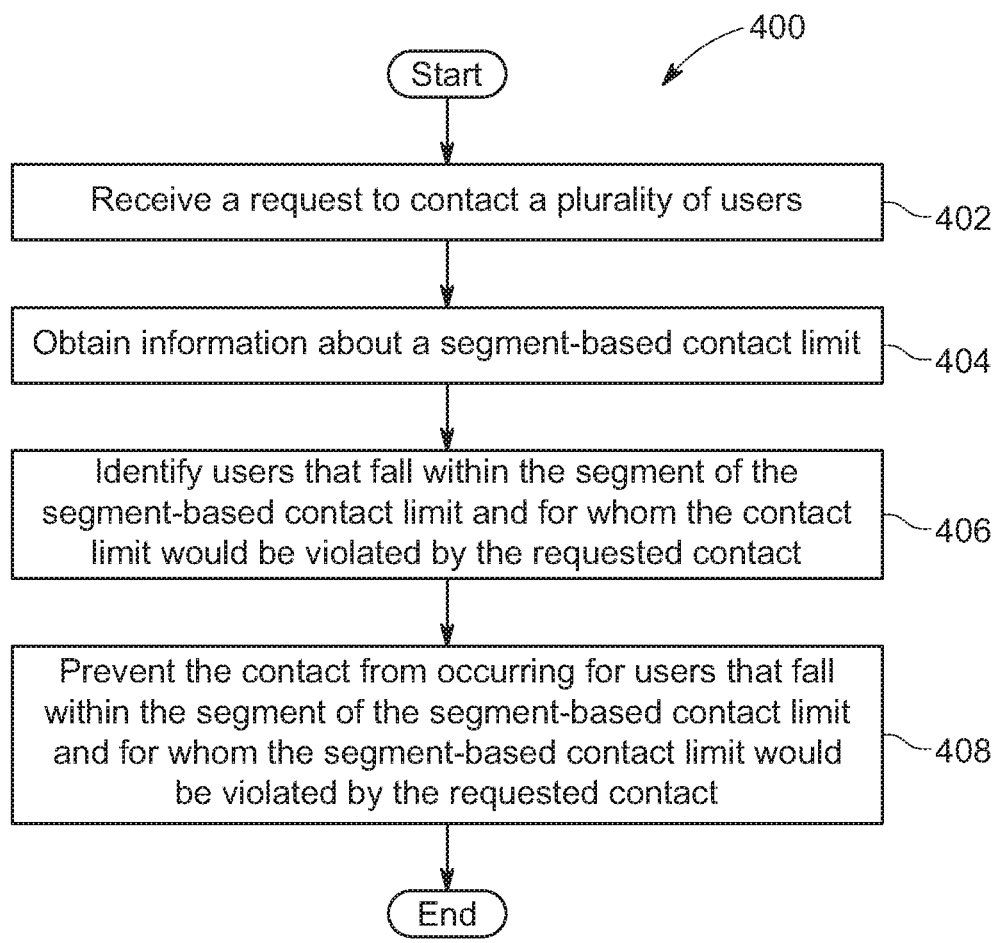
FIG. 4 is a diagram illustrating steps of a first method embodying the invention for limiting contacts with users.

In some embodiments, the illustrated computer system may implement any of the operations and methods described above, such as the methods illustrated by the flowcharts of FIGS. 4-6. In other embodiments, different elements and data may be included.

Those skilled in the art will appreciate that the computer system 700 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or nonvolatile media such as RAM (e.g., SDRAM, DDR, RDRAM, SRAM, and the like), ROM, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of controlling client contacts with a plurality of the client's users, comprising:
    receiving a request to contact a plurality of the client's users;
    obtaining information about a segment-based contact limit for the plurality of users, wherein the information indicates a maximum number of contacts that can be made with a user in the segment within a predetermined time window;
    identifying those of the plurality of users that fall within the segment of the segment-based contact limit and for whom the segment-based contact limit would be violated by the requested contact; and
    preventing the requested contact from occurring for those of the plurality of users that fall within the segment of the segment-based contact limit and for whom the segment-based contact limit would be violated by the requested contact.

2. The method of claim 1, wherein obtaining information about a segment-based contact limit comprises obtaining information about at least one filter that defines the segment.

3. The method of claim 2, wherein obtaining information about at least one filter comprises obtaining information about a plurality of filters that define the segment.

4. The method of claim 2, wherein obtaining information about a segment-based contact limit comprises obtaining information about a maximum number of messages that may be sent to a user in the segment within a predetermined time window.

5. The method of claim 2, wherein obtaining information about a segment-based contact limit comprises obtaining information about a maximum number of campaigns that may be conducted for a user in the segment within a predetermined time window.

6. The method of claim 1, wherein obtaining information about a segment-based contact limit comprises determining a segment-based contact limit for the plurality of users using then-available data, where the determined segment-based contact limit includes information about at least one filter that defines the segment and information about a maximum number of contacts that can be made with a user in the segment within a predetermined time window.

7. The method of claim 1, wherein the obtaining step comprises obtaining information about a first segment-based contact limit for the plurality of users, and wherein the method further comprises:
obtaining information about a second segment-based contact limit for the plurality of users, wherein the information indicates a maximum number of contacts that can be made with a user in the segment of the second segment-based contact limit within a predetermined time window;
identifying those of the plurality of users that fall within the segment of the second segment-based contact limit and for whom the second segment-based contact limit would be violated by the requested contact; and
preventing the requested contact from occurring for those of the plurality of users that fall within the segment of the second segment-based contact limit and for whom the second segment-based contact limit would be violated by the requested contact.

8. The method of claim 7, further comprising causing the contact to occur for those of the users that fall outside the segments of the first and second segment-based contact limits and for those users within the segments of the first and second segment-based contact limits and for whom the first and second segment-based contact limits would not be violated by the requested contact.

9. The method of claim 1, wherein the information about the segment-based contact limit is included with the request to contact a plurality of the client's users.

10. The method of claim 1, wherein obtaining information about a segment-based contact limit for the plurality of users comprises identifying any segment-based contact limits that exist for those users that are included within the plurality of users identified in the contact request.

11. A system for controlling client contacts with a plurality of the client's users, comprising:
means for receiving a request to contact a plurality of the client's users;
means for obtaining information about a segment-based contact limit for the plurality of users, wherein the information indicates a maximum umber of contacts that can be made with a user in the segment within a predetermined time window;
means for identifying those of the plurality of users that fall within the segment of the segment-based contact limit and for whom the segment-based contact limit would be violated by the requested contact; and
means for preventing the requested contact from occurring for those of the plurality of users that fall within the segment of the segment-based contact limit and for whom the segment-based contact limit would be violated by the requested contact.

12. A system for controlling client contacts with a plurality of the client's users, comprising:
a message sending unit that is configured to receive a request to contact a plurality of the client's users; and a contact limiting unit comprising:
a segment-based contact limit identification unit that obtains information about a segment-based contact limit for the plurality of users, wherein the information indicates a maximum number of contacts that can be made with a usr in the segment within a predetermined time window, and
a limited users identification unit comprising:
a filter unit that identifies those of the plurality of users that fall within the segment of the segment-based contact limit and for whom the segment-based contact limit would be violated by the requested contact; and
a contact limit application unit that prevents the requested contact from occurring for those of the plurality of users that fall within the segment of the segment-based contact limit and for whom the segment-based contact limit would be violated by the requested contact.

13. The system of claim 12, wherein the segment-based contact limit identification unit obtains information about at least one filter that defines the segment.

14. The system of claim 13, wherein the segment-based contact limit identification unit obtains information about a plurality of filters that define the segment.

15. The system of claim 13, wherein the segment-based contact limit identification unit obtains information about a maximum number of messages that may be sent to a user in segment within a predetermined time window.

16. The system of claim 13, wherein the segment-based contact limit identification unit obtains information about a maximum number of campaigns that may be conducted for a user in segment within a predetermined time window.

17. The method of claim 12, wherein the segment-based contact limit identification unit determines a segment-based contact limit for the plurality of users using then-available data, where the determined segment-based contact limit includes information about at least one filter that defines the segment and information about a maximum number of contacts that can be made with a user in the segment within a predetermined time window.

18. The system of claim 12, wherein the segment-based contact limit identification unit obtains information about first and second segment-based contact limits for the plurality of users, wherein the filter unit identifies those of the plurality of users that fall within the segments of the first and second segment-based contact limits and for whom the first second segment-based contact limit would be violated by the requested contact, and wherein the contact limit application unit prevents the requested contact from occurring for those of the plurality of users that fall within the segments of the first and second segment-based contact limits and for whom the first and second segment-based contact limits would be violated by the requested contact.

19. The system of claim 18, further comprising causing the contact to occur for those of the users that fall outside the segments of the first and second segment-based contact limits and for those users within the segments of the first and second segment-based contact limits and for whom the first and second segment-based contact limits would not be violated by the requested contact.

20. The system of claim 12, wherein the information about the segment-based contact limit is included with the request to contact a plurality of the client's users.

21. The system of claim 12, wherein the segment-based contact limit identification unit identifies any segment-based contact limits that exist for those users that are included within the plurality of users identified in the contact request.

* * * * *